United States Patent [19]

Coppinger

[11] Patent Number: 5,987,150
[45] Date of Patent: *Nov. 16, 1999

[54] VIDEO CAPTURING USING ON-SCREEN GRAPHICS

[75] Inventor: Roy Coppinger, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/707,048

[22] Filed: Aug. 30, 1996

[51] Int. Cl.$^6$ ............................................... G06K 9/62
[52] U.S. Cl. ........................ 382/100; 348/474; 348/589
[58] Field of Search ............................. 382/100; 348/589, 348/600, 473, 474, 476, 461; 707/104

[56] References Cited

U.S. PATENT DOCUMENTS

| | | | |
|---|---|---|---|
| 4,943,866 | 7/1990 | Barker et al. | 386/52 |
| 5,012,334 | 4/1991 | Etra | 348/107 |
| 5,262,860 | 11/1993 | Fitzpatrick et al. | 348/476 |
| 5,436,653 | 7/1995 | Ellis et al. | 348/2 |
| 5,450,134 | 9/1995 | Legate | 348/473 |
| 5,481,296 | 1/1996 | Cragun et al. | 348/461 |
| 5,488,425 | 1/1996 | Grimes | 348/559 |
| 5,655,117 | 8/1997 | Goldberg et al. | 707/102 |
| 5,703,655 | 12/1997 | Corey et al. | 348/468 |
| 5,819,286 | 10/1998 | Yang et al. | 707/104 |
| 5,872,865 | 2/1999 | Normile et al. | 382/224 |

OTHER PUBLICATIONS

Zhang et al. "Automatic Parsing of News Video." Proceedings of Int. Conf. on Multimedia Computing and Systems, pp. 45–54, May 1994.

Smoliar et al. "Content Based Video Indexing and Retrieval." IEEE Multimedia, vol. 1, No. 2, pp. 62–72, 1994.

Wactlar et al. "Intelligent Access to Digital Video: Informedia Project." Computer, vol. 29, No. 5, pp. 46–52, May 1996.

Yeung et al. "Extracting Story Units from Long Programs for Video Browsing and Navigation." Proceedings of 3rd IEEE Int. Conf. on Multimedia Computing and Systems, pp. 296–305, Jun. 1996.

Weiss, et al. "Composition and Search With A Video Algebra." IEEE Multimedia, vol. 2, No. 1, pp. 12–25, Spring 1995.

*Primary Examiner*—Jon Chang
*Attorney, Agent, or Firm*—Duane, Morris & Heckscher LLP

[57] ABSTRACT

A video segment on a preselected subject is captured by recognizing a graphic associating the video segment with the subject and capturing the video segment upon such recognition. In an embodiment, one or more graphics to be recognized are pre-identified.

24 Claims, 4 Drawing Sheets

VIDEO CAPTURING USING ON-SCREEN GRAPHICS

BACKGROUND OF THE INVENTION

1. Field of the Invention

This invention relates to the field of video capturing and more particularly to capturing video segments associated with a preselected subject.

2. Background of the Related Art

General video capturing techniques, and the hardware and software necessary for implementing the techniques, are relatively well-known and developed. Less developed are techniques and associated hardware and software for capturing specific segments of video concerning or associated with a particular defined subject. For example, it might be desirable to capture all video carried over one or more channels which concerns or is associated with a current event, such as a war or criminal trial. In other instances, it might be desirable to capture all video concerning a particular person, such as a United States president or famous sports figure. Certain experiments have been conducted using image recognition software for identifying particular, preselected images in video which relate to or depict a certain subject for capture. Currently, image recognition technology is expensive and does not provide sufficient accuracy to ensure that all or at least a large percentage of video segments on or associated with a particular subject will be recognized for capture. Furthermore, it is not always certain that a particular searched-for image will appear in every video segment on or associated with a preselected subject. For example, not every video segment on or associated with the president of the United States includes the president's image.

Audio recognition technology also can be used for video capture, e.g. by searching for the speech of a certain person or person(s) and recording the associated video (and, of course the recognized audio). Audio recognition technology, when used for video capture, has faults similar to those of video recognition technology used for video capture: It is expensive and not sufficiently accurate for the purpose.

Certain broadcasters have employed editors who review video and manually index the video segments which comprise the video according to the subject matter to which the segments pertain. Video segments on selected subjects are thus easily located at a later time. This technique generally is accurate but obviously is labor intensive and therefore inefficient.

SUMMARY OF THE INVENTION

Briefly, in accordance with one embodiment of the invention, a video segment on a preselected subject is captured by recognizing a graphic associating the video segment with the subject and capturing the video segment upon such recognition.

BRIEF DESCRIPTION OF THE DRAWINGS

The following detailed description will be more fully understood with reference to the accompanying drawings in which.

DETAILED DESCRIPTION OF A PREFERRED EMBODIMENT

The invention uses one or more graphics associated with a video segment to identify the video segment for capture. It should be understood that throughout this specification, the terms "graphic" or "graphics" includes, but is not limited to, computer-generated images, symbols, visual representations of objects and scenes, pictures and text. Typically, the one or more graphics are inserted into the video segment by a broadcaster before the video clip is broadcasted or otherwise transmitted, typically as a television signal. These are called "onscreen graphics" by the broadcasters.

Figure 1A:
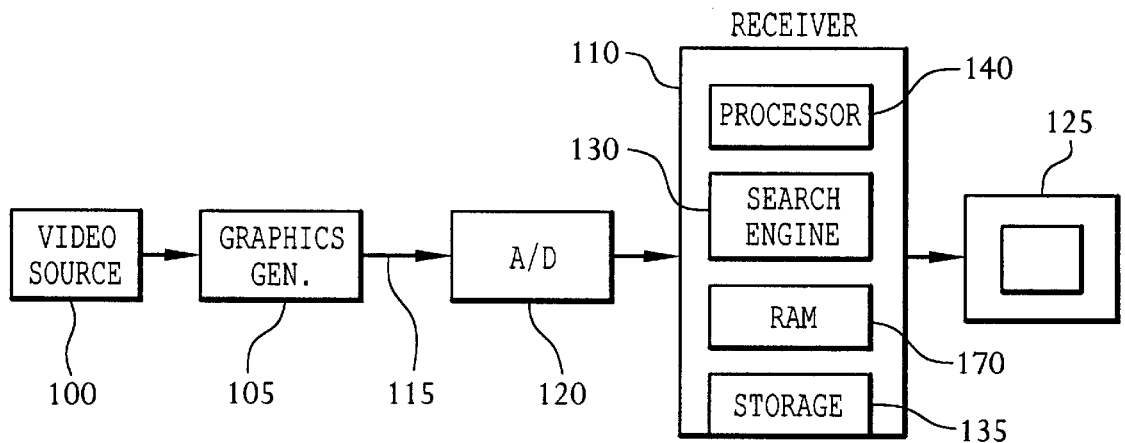
FIGS. 1A and 1B are block diagrams of an embodiment of the invention.
Figure 1B:
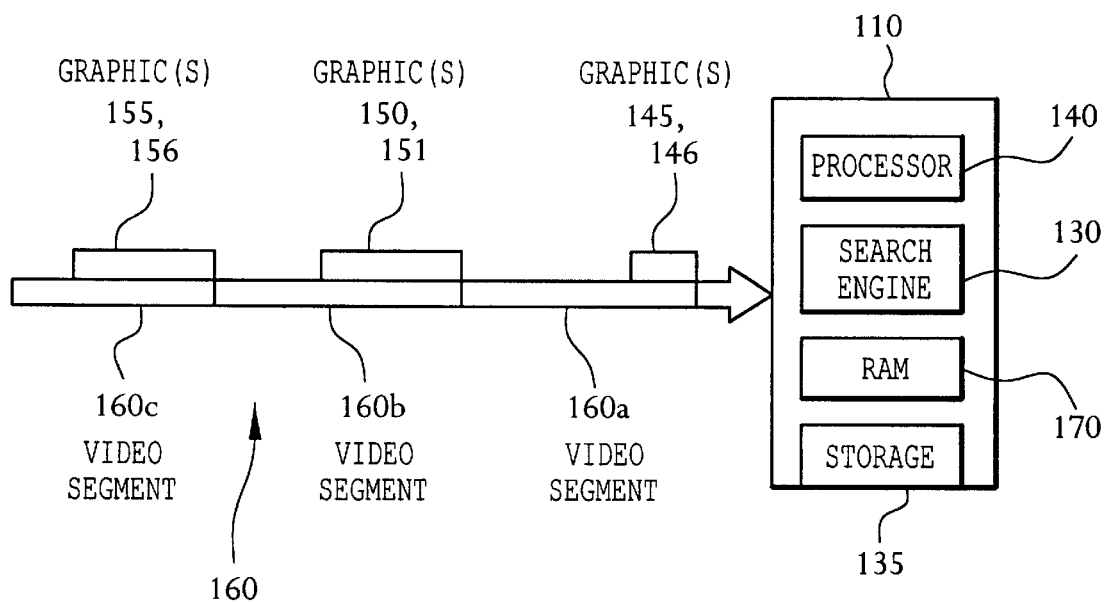
Figure 2:
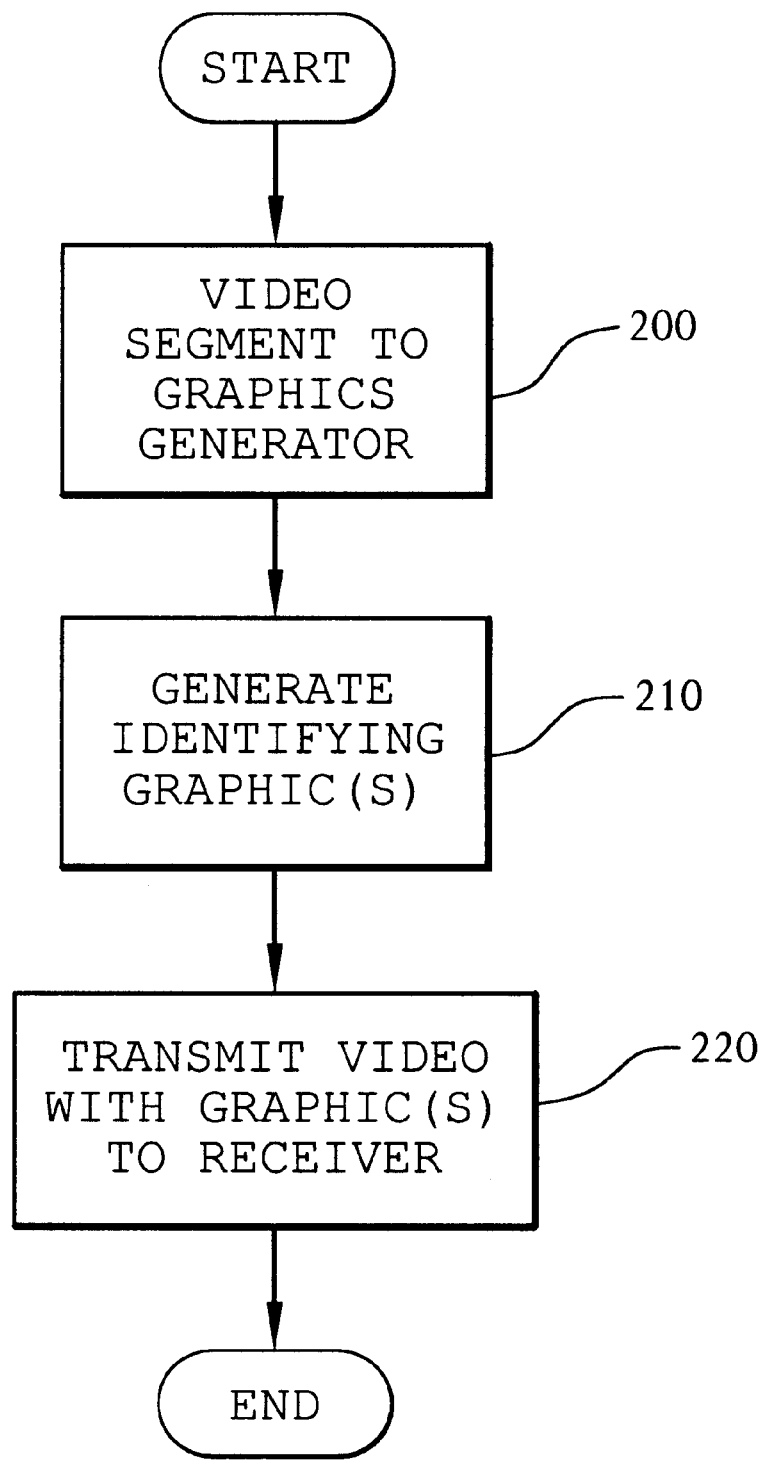
FIG. 2 is a flow chart showing steps of associating graphics with video.

Referring to FIGS. 1A and 1B, block diagrams of an embodiment of the invention, and FIG. 2, a flow chart showing steps of associating one or more graphics with video, video 160 from video source 100 is passed to graphics generator 105 (step 200 of FIG. 2). Video source 100 can generate video or convey video which has been remotely generated. In an embodiment, video source 100 is a television broadcast studio. Any type of video, such as typical television station fare, e.g., sporting events, sitcoms, movies, etc., can be sourced from video source 100, however, the invention is particularly useful when the video comprises a series of essentially contiguous video segments (160a, 160b, 160c) such as a series of news clips or the like.

Figure 3A:
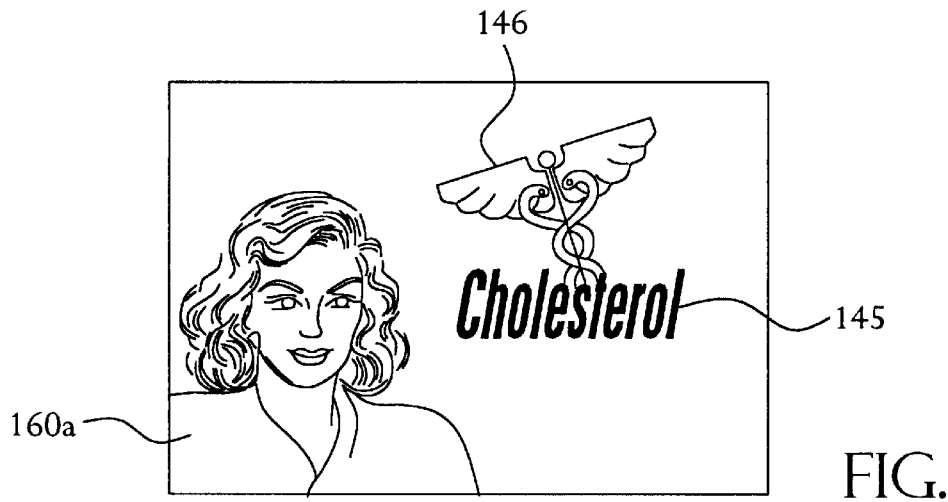
FIGS. 3A, 3B and 3C are screen captures showing graphics associated with video segments.
Figure 3B:
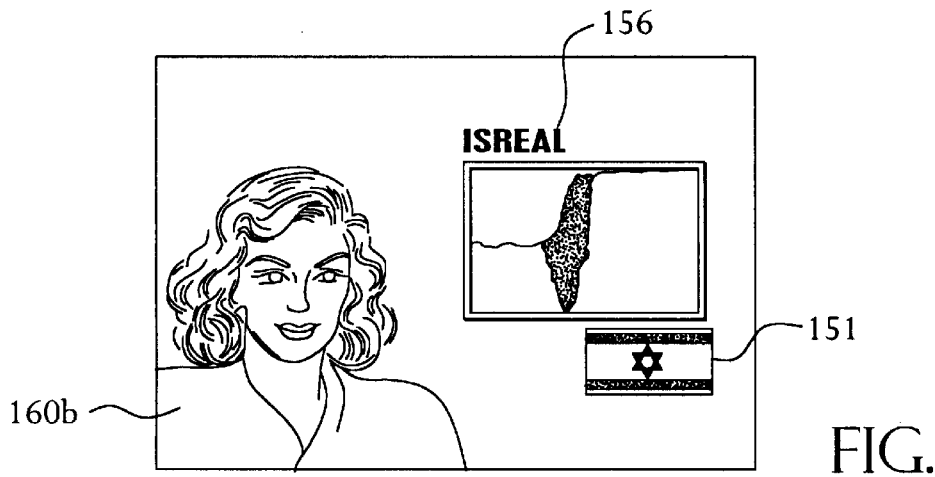
Figure 3C:
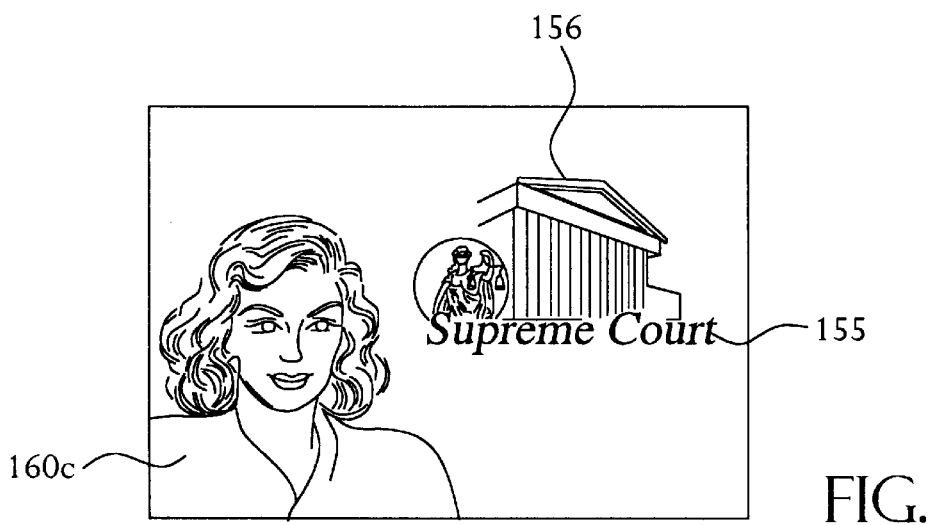

Referring also to FIGS. 3A, 3B and 3C, graphics generator 105 is used to generate graphics 145, 146, 150, 151, 155 and 156 (step 210) which will appear immediately before, at the beginning of and/or during reproduction of the video. The graphics advantageously are inserted by a television broadcaster or other entity associated with video source 100 and serve to introduce the subject of a video segment and associate the video segment with the subject. Where the video includes a plurality of discrete video segments, such as 160a–c, relating to different subjects, one or more different graphics typically are associated with each video segment and associate the video segment with the particular different subject. In the context of a television news broadcast, where many video segments concerning a variety of newsworthy topics are broadcast for reproduction, the graphics relate to the particular topic with which a video segment is concerned. For example, during a particular television news broadcast of finite duration, a video segment 160a might be aired concerning cholesterol's effects on the heart and health. Graphics generator 105 generates one or more graphics to identify the subject of video segment 160a. For example, graphics generator 105 associates graphics 145, 146 with video segment 160a. Graphic 145 is the word "cholesterol." Graphic 146 is the emblem of the American Medical Association. A person of ordinary skill will see that any graphics through which a viewer likely would quickly recognize the general subject of a video segment can be associated by graphics generator 105 with the video segment. The graphics 145, 146 serve to introduce the news story on cholesterol to a television viewer and could catch the attention of an otherwise inattentive viewer, should such news be of interest to him.

The video segment 160a on cholesterol might be followed by, for example, a video segment 160b on Israel. In this case, the graphics 150, 151 generated by graphics generator 105 and shown at the introduction of or during the video segment 160b are the word "Israel" and the Israeli flag, which serve to alert the viewer to the subject of video segment 160b.

The video segment 160b on the Israel might be followed, for example, by a news story and video segment 160c on the Supreme Court or a recent decision of the Supreme Court. Graphics 155 and 156 generated by graphics generator 105 are the words "Supreme Court" and an image of the Supreme Court building.

These are just a few of the many examples of the video segments which might be broadcast and to which graphics information can be associated by graphics generator 105. It should be understood that there is no limit on the different graphics which might be generated by graphics generator 105 to associate any particular video segment with its subject. Furthermore, one or more graphics can be associated with any one video segment. Whatever graphics are used likely will be judiciously chosen to produce a rapid association between the video segment and its subject by a viewer.

Video 160, including graphics 145, 146, 150, 151, 155 and 156 from graphics generator 105, is transmitted over transmission medium 115 to receiver 110 (step 220). Transmission medium 115 can be the atmosphere, wire or fiber optic cable, and any other medium through which electromagnetic radiation, and analog or digital electrical signals can be transmitted, as is known to persons of ordinary skill.

Figure 4:
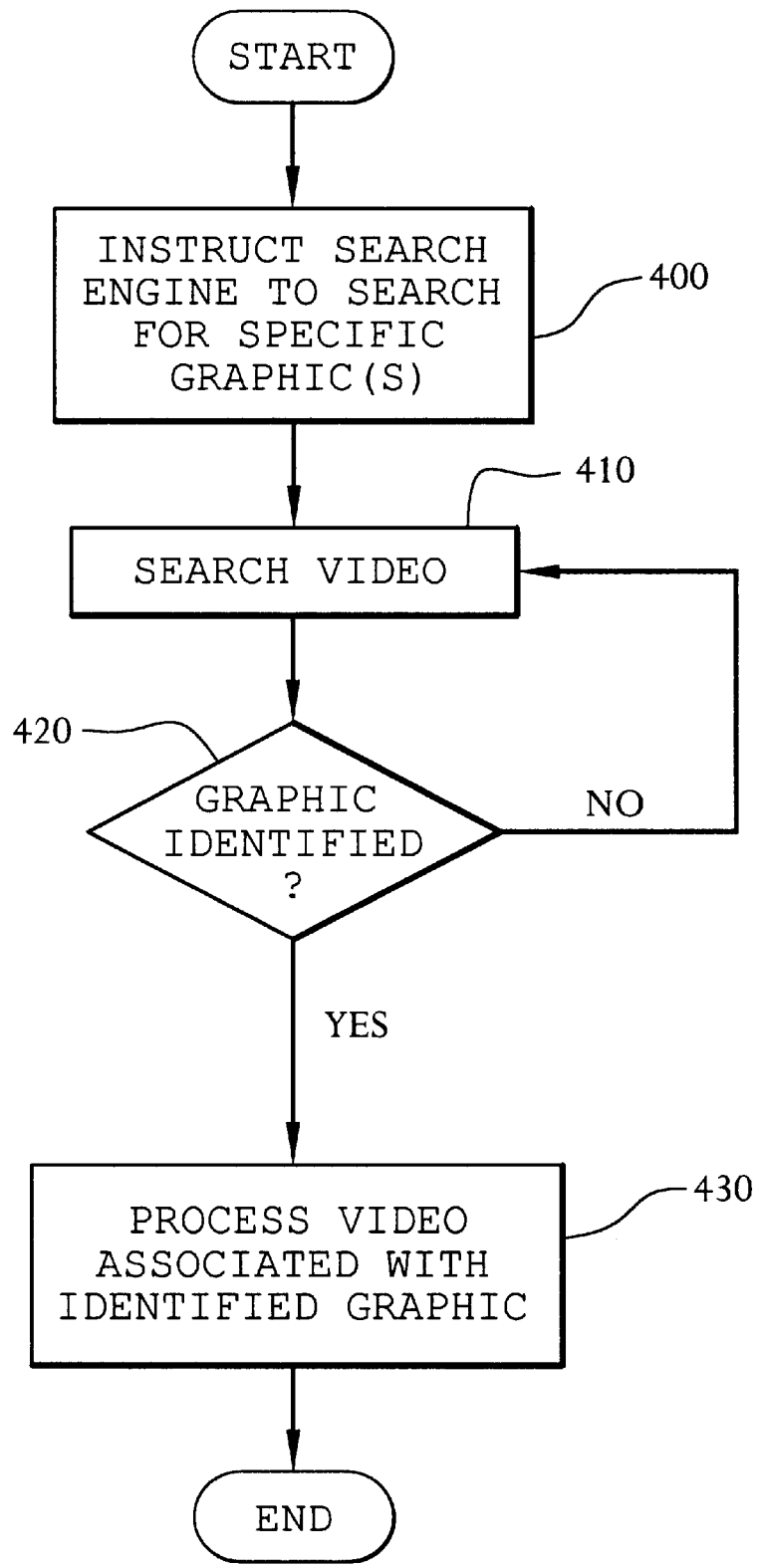
FIG. 4 is a flow chart of an embodiment of the invention.

Referring now to FIGS. 1A and 1B, and FIG. 4, a flow chart of an embodiment of the invention, receiver 110 includes search engine 130. Search engine 130 can be implemented in software. Search engine 130 is instructed to search for one or more preselected graphics, such as graphics 145, 146, 150, 151, 155 and 156, associated with incoming video 160 (step 400 of FIG. 4). Search engine 130 searches video received over transmission medium 115 for the specific graphic or graphics (step 410). In the event search engine 130 recognizes a graphic, such as graphic 145 and/or 146 (step 420), search engine 130 causes processing of the video, such as video segment 160*a* associated with the graphic (step 430). Such processing might entail, for example, storing video segment 160*a* to mass storage 135. Search engine 130 can be instructed to begin searching at predetermined times for a set duration, such as during the broadcast times of television programs of interest.

It is known that broadcasters often include text associated with a video segment in the vertical blanking interval of the television transmission. The invention, in association with any storing of the video segment in accordance with step 430, also will store this text.

Receiver 110 preferably includes processor 140 for processing digital signals as required by search engine 130. Analog-to-digital converter 120 may be included as necessary and used to digitize analog video signals before they are input to receiver 110. Technology for converting analog video and television signals to digital signals for processing by processor 140 is known to those having skill in the art. In an embodiment, receiver 110 is a personal computer and processor 140 is a high-performance processor such as an Intel Pentium® processor or Pentium® Pro processor. In such an embodiment, receiver 110 includes memory, such as random access memory (RAM) 170, into which programs will be run are first loaded. It should be understood that such processing by search engine 130 and processor 140 can include display on monitor 125 coupled to receiver 110.

As discussed above, search engine 130 can be instructed to search for one or more preselected graphics which are likely to be associated with particular video segments. Video segments associated with a preselected graphic or graphics or subjected to special processing. Instructions concerning the identify of the graphics and the type of special processing can be entered, for example, by an input device such as a keyboard or mouse (not shown in FIGS. 1A or 1B) coupled to receiver 110. In the event search engine 130 is a software program loaded into RAM 170 and running on a windowed operating system, search engine 130 can generate a graphical user interface through which the instructions can be entered.

Processing according to step 430 typically can include storing the video segment to mass storage device 135 for later viewing on monitor 125. For example, a person interested in news or information on Israel would instruct search engine 130 to sample incoming video and process only video segments having one or more associated graphics which read, for example, "Israel", show the Israeli flag or the like to capture video segment 160*b*. The identity of a particular graphic or graphics which will trigger processing is selectable by the interested person. It should be understood that in this embodiment, accurate capturing, i.e., whether the captured video segment actually pertains to Israel, depends in part on the identity of the one or more graphics for which search engine 130 has been instructed to search. Accuracy does depend in some part on the selection of the graphic or graphics made by the broadcaster which are associated and transmitted with the video. One can see that in this embodiment, there must be an agreement between the identity of one or more graphics associated with the video by the broadcaster or the like using graphics generator 105 and the identity of one or more graphics for which search engine 130 is instructed to search, for example, by an interested viewer.

A broadcaster can ensure that video capturing is highly accurate by using one or more "standard" graphics in association with certain subjects. A user can be made aware of the standards, and can, in step 400, instruct search engine 130 accordingly. A broadcaster has an incentive to use such standard graphics, e.g., to attract users interested in accurate video capturing using the invention.

In an embodiment of the invention, processing step 430 includes indexing the video before it is stored, for example to mass storage device 135, so that it may be easily found and retrieved. Relatedly, processing step 430 can include generation of a message notifying a user that one or more video segments associated with one or more searched-for graphics have been captured. The message could be displayed on an appropriate display device such as monitor 125. In such a manner, a user would be alerted to the capture of the one or more video segments on the one or more preselected subjects and could use the index or indices to easily retrieve the video segments for use, such as to view them on monitor 125.

There a variety of ways in which search engine 130 can identify the end of a particular searched-for video segment to trigger a cessation of processing. Typically, for example, a conclusion of one video segment is immediately followed by the start of another video segment Where the first video segment is a searched-for video segment, a graphic associated with the video segment immediately following the searched-for video segment can be recognized by search engine 130 to trigger termination of processing of the searched-for video segment. Moreover, processing can be made to terminate in the event the searched-for video segment cuts to a commercial or the like, such as by search engine 130 recognizing any graphics associated with the commercial and terminating processing of the searched-for video segment. Processing also can be made to terminate by the reappearance on the screen of an anchorperson or the like, such as at the conclusion of the video segment. Additionally, since many video segments rarely exceed five minutes or so in length, termination also can be caused by the expiration of a predetermined time period. In a further embodiment, broadcasters can cooperate to ease use of the invention by inserting end-of-segment markers at the end of each video segment which are recognizable by search engine 130.

In an embodiment of the invention, all arriving video is input to a first-in, first-out cache buffer having a capacity sufficient to store a short duration of video. All video in the cache buffer at the moment of any recognition of an on-screen graphic is processed by processor 140, along with video received after the recognition. This feature enables processing of video which may be relevant to a subject, but which is displayed before the appearance of a searched-for graphic leading in to the video segment. Operation of the cache buffer is such that "old" video data in the cache buffer is overwritten as new video data enters, in a first-in, first-out manner known to those having skill in the art. The capacity of the cache buffer preferably is large enough to capture any lead-in to a news video segment which appears before the display of any graphic, and therefore the capacity typically need only be 10–15 seconds of video data.

Typically, video source 100 and graphics generator 105 are disposed in a common location, such as a television studio. In an embodiment, monitor 125 and receiver 110, including search engine 135, processor 140, RAM 170 and mass storage 135 are disposed in a remote, common location, such as a home or residence. In other embodiments of the invention, search engine 130 and any necessary processor or RAM are disposed in the broadcast studio or in an intermediate location in the transmission path of the video to its ultimate destination, such as at a cable downlink facility or local cable head-end. In this manner, an end user of the video, such as a home viewer, may receive preselected video directly from a broadcaster or cable company without having to obtain search engine 130 or use a receiver with advanced processing capabilities. The broadcast studio, cable downlink facility or local cable head-end could search video for one or more preselected graphics and send captured video directly to end users based on a communicated desire to receive the video. In another embodiment, the broadcast studio, cable downlink facility or local cable head-end could locally store video captured according to one or more identifying graphics and provide such video to an end-user in accordance with a later request for video pertaining to the subject of the one or more identifying graphics. One can see that use of the invention in this way also lends itself to automated archiving of captured video by subject.

In another embodiment, receiver 110, including processor 140, RAM 170, search engine 130 and mass storage 135 can be part of a network at a corporate site or the like. In such an embodiment, mass storage device 135 is a file server or the like accessible by networked computers. Video captured by subject according to one or more searched-for graphics associated with the video is stored to mass storage 135 for later accessing by any of the network users. The invention deployed in this manner thus enables networked corporate employees to access significant amounts of indexed captured video to keep abreast of current events which could affect the corporation.

The present invention can be embodied in the form of methods and apparatuses for practicing those methods. The present invention also can be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments combine with the microprocessor to provide a unique device that operates analogous to specific logic circuits.

It should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A computer-implemented method for processing video, comprising the steps of:
   (a) receiving video from a video provider, the video comprising a series of essentially contiguous video segments, each video segment having a subject, wherein one or more of the video segments each comprise at least one nontextual, on-screen graphic representative of the subject of said each video segment, wherein the nontextual graphic is inserted by the video provider near the beginning of said each video segment so that when said each video segment is displayed, a human viewer is enabled to recognize the subject of said each video segment upon viewing the displayed graphic;
   (b) comparing, with a computer, nontextual, on-screen graphics of video segments of the video to a preselected graphic corresponding to a target subject of interest to a human user;
   (c) determining, with the computer, that a video segment has the target subject when a nontextual, on-screen graphic of the video segment matches the preselected graphic; and
   (d) processing the video segment upon said determination by the computer.

2. The method of claim 1, wherein step (d) comprises the step of capturing the video segment.

3. The method of claim 2, further comprising the step of:
   (e) signaling the capture of the video segment.

4. The method of claim 2, further comprising the step of: temporarily storing a portion of the video segment before step (b).

5. The method of claim 2, further comprising the steps of:
   (e) recognizing an end of the video segment; and
   (f) stopping capture of the video segment in response to step (e).

6. The method of claim 2, further comprising the step of:
   (e) cataloging the captured video segment.

7. The method of claim 1, wherein steps (b) and (c) occur at one of a broadcast studio, a cable downlink facility, a local cable head-end, a corporate video server, and a residence.

8. The method of claim 1, further comprising, before step (b), the step of identifying said nontextual, on-screen graphics as being nontextual, on-screen graphics.

9. A computer-readable medium having stored thereon a plurality of instructions which, when executed by a processor of a computer, cause the processor to perform the steps of:

(a) receiving video from a video provider, the video comprising a series of essentially contiguous video segments, each video segment having a subject, wherein one or more of the video segments each comprise at least one nontextual, on-screen graphic representative of the subject of said each video segment, wherein the nontextual graphic is inserted by the video provider near the beginning of said each video segment so that when said each video segment is displayed, a human viewer is enabled to recognize the subject of said each video segment upon viewing the displayed graphic;

(b) comparing, with the processor, nontextual, on-screen graphics of video segments of the video to a preselected graphic corresponding to a target subject of interest to a human user;

(c) determining, with the processor, that a video segment has the target subject when a nontextual, on-screen graphic of the video segment matches the preselected graphic; and (d) processing the video segment upon said determination by the processor.

10. The computer-readable medium of claim 9, wherein step (d) comprises the step of capturing the video segment.

11. The computer-readable medium of claim 10, wherein the plurality of instructions cause the processor to perform the further step of:

(e) signaling the capture of the video segment.

12. The computer-readable medium of claim 10, wherein the plurality of instructions cause the processor to perform the further step of:

temporarily storing a portion of the video segment before step (b).

13. The computer-readable medium of claim 10, wherein the plurality of instructions cause the processor to perform the further steps of:

(e) recognizing an end of the video segment; and (f) stopping capture of the video segment in response to step (e).

14. The computer-readable medium of claim 10, wherein the plurality of instructions cause the processor to perform the step of:

(e) cataloging the captured video segment.

15. The computer-readable medium of claim 9, wherein steps (b) and (c) occur at one of a broadcast studio, a cable downlink facility, a local cable head-end, a corporate video server, and a residence.

16. The computer-readable medium of claim 9, wherein the plurality of instructions cause the processor to perform, before step (b), the further step of identifying said nontextual, on-screen graphics as being nontextual, on-screen graphics.

17. A computer system for processing video, comprising:
a processor; and
a memory coupled to the processor, wherein the memory stores a sequence of instructions which, when executed by the processor, cause the processor to perform the steps of:

(a) receiving video from a video provider, the video comprising a series of essentially contiguous video segments, each video segment having a subject, wherein one or more of the video segments each comprise at least one nontextual, on-screen graphic representative of the subject of said each video segment, wherein the nontextual graphic is inserted by the video provider near the beginning of said each video segment so that when said each video segment is displayed, a human viewer is enabled to recognize the subject of said each video segment upon viewing the displayed graphic;

(b) comparing, with the processor, nontextual, on-screen graphics of video segments of the video to a preselected graphic corresponding to a target subject of interest to a human user;

(c) determining, with the processor, that a video segment has the target subject when a nontextual, on-screen graphic of the video segment matches the preselected graphic; and (d) processing the video segment upon said determination by the processor.

18. The computer system of claim 17, wherein step (d) comprises the step of capturing the video segment.

19. The computer system of claim 18, wherein the sequence of instructions cause the processor to perform the further step of:

(e) signaling the capture of the video segment.

20. The computer system of claim 18, wherein the sequence of instructions cause the processor to perform the further step of:

temporarily storing a portion of the video segment before step (b).

21. The computer system of claim 18, wherein the sequence of instructions cause the processor to perform the further steps of:

(e) recognizing an end of the video segment; and (f) stopping capture of the video segment in response to step (e).

22. The computer system of claim 18, wherein the sequence of instructions cause the processor to perform the step of:

(e) cataloging the captured video segment.

23. The computer system of claim 17, wherein steps (b) and (c) occur at one of a broadcast studio, a cable downlink facility, a local cable head-end, a corporate video server, and a residence.

24. The computer system of claim 17, wherein the sequence of instructions cause the processor to perform, before step (b), the further step of identifying said nontextual, on-screen graphics as being nontextual, on-screen graphics.

* * * * *